US006615732B2

(12) United States Patent
Hunold et al.

(10) Patent No.: US 6,615,732 B2
(45) Date of Patent: Sep. 9, 2003

(54) METHOD AND APPARATUS FOR SETTING REGISTER ON A MULTICOLOR PRINTING MACHINE

(75) Inventors: Heiko Hunold, Wattenbek (DE); Patrick Metzler, Gettorf (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/855,463

(22) Filed: May 15, 2001

(65) Prior Publication Data

US 2002/0050219 A1 May 2, 2002

Related U.S. Application Data

(60) Provisional application No. 60/204,883, filed on May 17, 2002.

(51) Int. Cl.[7] ........ B41L 47/56

(52) U.S. Cl. ........ 101/486; 101/484; 347/116; 358/1.18; 399/301

(58) Field of Search ........ 101/486, 484; 347/116; 399/301; 358/1.18

(56) References Cited

U.S. PATENT DOCUMENTS

| | | | | | |
|---|---|---|---|---|---|
| 4,546,700 | A | * | 10/1985 | Kishner et al. | 101/211 |
| 5,138,667 | A | * | 8/1992 | Roch et al. | 382/112 |
| 5,287,162 | A | * | 2/1994 | de Jong et al. | 399/49 |
| 5,806,430 | A | * | 9/1998 | Rodi | 101/484 |
| 6,278,857 | B1 | * | 8/2001 | Monji et al. | 399/301 |
| 6,493,012 | B2 | * | 12/2002 | Buch et al. | 347/116 |
| 2002/0001491 | A1 | * | 1/2002 | Buch et al. | 399/301 |
| 2002/0050219 | A1 | * | 5/2002 | Hunold et al. | 101/484 |

FOREIGN PATENT DOCUMENTS

| | | | | | |
|---|---|---|---|---|---|
| JP | 2001142278 | A | * | 5/2001 | G03G/15/01 |
| JP | 2002240247 | A | * | 8/2002 | B41F/33/14 |

* cited by examiner

*Primary Examiner*—Charles H. Nolan, Jr.
(74) *Attorney, Agent, or Firm*—Lawrence P. Kessler

(57) ABSTRACT

A method and apparatus for setting register on a multicolor printing machine (1) having color printing units (6, 6', 6", 6'") assigned to various printing inks, at least one image cylinder (2, 2', . . . ), image production equipment (3,3', . . . ) for producing color separations (7, 7', . . . ) on the at least one image cylinder (2, 2', . . . ) and a carrier (4) for printing substrates (15). An assignment of the image production points (11, 11', . . . ) on the at least one image cylinder (2, 2', . . . ) is carried out in order to achieve coincidence of register between the color separations (7, 7', . . . ) in the print, by both the production of the image starts (10) and the production of areas (10', 10", . . . , 10") of the color separations (7, 7', . . . ) set on the basis of the print and the evaluation of register marks (9, 9', 9", 9'").

44 Claims, 3 Drawing Sheets

METHOD AND APPARATUS FOR SETTING REGISTER ON A MULTICOLOR PRINTING MACHINE

This application claims the benefit of Provisional Application No. 60/204,883, filed May 17, 2000.

The invention relations to a method for setting register on a multicolor printing machine having color printing units assigned to various printing inks, at least one image cylinder, image production equipment for producing color separations, in particular electrostatic latent color separations, on the at least one image cylinder, a carrier for printing substrates and at least one image transfer point for the transfer of the color separations to the printing substrates, an assignment of the image production points on the at least one image cylinder being carried out in order to achieve coincidence of register between the color separations in the print, by both the production of the image starts and the production of areas of the color separations being set on the basis of the print and the evaluation of register marks.

The invention also relates to apparatus for setting register in accordance with the above-mentioned method on a multicolor printing machine having color printing units assigned to various printing inks, at least one image cylinder, image production equipment for producing color separations, in particular electrostatic latent color separations, on the at least one image cylinder, a carrier for printing substrates and at least one image transfer point for the transfer of the color separations to printing substrates, sensors for measuring positions and at least one setting device for assigning the positions of the image production points on the at least one image cylinder in order to achieve coincidence of register between the color separations in the print, at least one register sensor being arranged to detect register marks, and the setting device being designed such that it initiates the printing of register marks and evaluates them in such a way that it sets the production of the image starts and the production of areas of the color separations on this basis.

The invention also relates to a multicolor printing machine having apparatus of the aforementioned type.

Printing color illustrations, in particular color images, is carried out by a number of color separations being printed over one another. These are generally the colors yellow, magenta and cyan, as well as black. If required, special colors are also added. By means of overprinting these colors, all color compositions can be achieved, the quality of the prints depending significantly on the in-register overprinting of the color separations. In the case of conventional printing processes, the printing plates are corrected by means of test prints and register marks printed together with the latter until exact overprinting, that is to say the maintenance of register in the print is achieved.

In digital printing processes, the image cylinders are written with image points by means of an item of image production equipment in each case, for example, by electrostatic charges being generated and these being provided with adhering color pigments. The color pigments are then transferred to a printing substrate. In the case of digital printing processes, maintenance of register can be achieved by the image production equipment being controlled appropriately. Since the setting of an image is carried out anew for each print, it is not necessary, as in conventional printing processes, for a one-off setting to be made. Instead, provision can be made for presetting and regulation, which makes corrections for each individual print. Of course, this applies not only to the application of electrostatic latent images but also to all other printing processes in which image points are applied by means of a digital control system.

For an electrostatic printing process of the type mentioned at the beginning, U.S. Pat. No. 5,287,162 has, therefore, proposed printing register marks, preferably onto the carrier for the printing substrates and detecting these by means of an apparatus. In this case, the times which the register marks need from the production by the image production equipment as far as a detection point are determined. These times are then used to determine the instants at which the image production equipment begins its image-setting on the individual image cylinders in order to achieve the maintenance of register after the images have been transferred to a printing substrate. Faults, which can be produced in a manner, which repeats over time, by fluctuations in the speed of the image cylinders. Faulty determinations of the position by the rotary encoders of the image cylinders or other causes are registered by means of calibration tables. On the basis of these calibration tables, compensation for the faults is carried out. Provision is made for either the regulation of the image cylinder speeds, as a function of the position of the image cylinders, or corresponding production of the lines in the image.

Although, in the above-mentioned specification, mention is made of the fact that the start of the data, that is to say, the beginning of the image setting, and then the start of each line in the image, are controlled, what is lacking is the solution to the problem of obtaining data for the image starts and lines in the image or other subareas of a color separation in such a way that a rapid correction with high quality can be achieved with a tolerable outlay.

The invention is, therefore, based on the object of developing methods and apparatus of the type mentioned at the beginning in such a way that the setting of register can be implemented with a tolerable computing effort and high accuracy and, in particular, the data can be obtained and processed with a tolerable computing effort.

With regard to the method, the object is achieved by at least one picture page being printed which has register marks and has a length differing from that of the prints whose register is to be set, and in order to determine the correction values, by the data from the register marks of the at least one picture page being measured and placed in a relationship with positions of elements that carry images and substrates, and by the image production equipment being controlled in accordance with the correction values.

With regard to the apparatus, the object is achieved by its having at least one setting device which is designed such that it initiates the printing of at least one picture page which has register marks and has a length differing from that of the prints whose register is to be set, and by the at least one setting device being designed such that, in order to determine the correction values, it places the data from the detected register marks in a relationship with positions of elements that carry images and substrates, and controls the image production equipment in accordance with these correction values.

With regard to the multicolor printing machine, the object is achieved by its being equipped with apparatus of the above-mentioned type.

The invention has the advantage that it provides a method and apparatus by means of which, with a tolerable computing effort and within a short time, the correction values can be determined from the actual and desired values, and the corrections can be made. The basic idea of the invention consists in the ability to separate the actual values of the image starts from the actual values of the areas of the color separations by means of the proposed configuration of register marks. This separation can be carried out as an intermediate step, for example, for the determination by computation of the correction values for the image productions, or separate correction values can be determined and taken into account.

To achieve the aforementioned ability to be separated, it is proposed that at least one test print be made in which a picture page is printed which has register marks and which is longer than the prints whose register is to be set, or, if a number of picture pages are set up, that these be shorter than the prints whose register is to be set. Length deviations of this type make it possible to separate the faults in the image starts, which are caused by an assignment error between the image productions, from the faults in the image areas, which are caused by transfer faults in the color separations produced from the image production, as far as their transfer to a printing substrate. These different causes of the faults permit their separation, since the linking of the faults in the image starts with the faults in the areas of the color separations may be eliminated by means of the picture pages which have register marks and are of a length differing from the prints to be set up. This separation is necessary, at least within the calculation of correction values, in order to implement a register setting with a tolerable computing effort and high accuracy. The separation, to be performed at least as an intermediate computing step, is possible on the basis of the different characteristics of the faults, since the fault in the areas of the color separations occurs as an essentially periodic curve, and the fault in the image starts can be detected as an intercept not equal to zero (offset) of this curve.

However, the difficulty of this detection is that the average value of the curve in actual fact does not have a straight course either. In this way, the measured curve can be the superimposition of two curves, which have to be separated from each other in order to detect the faults in the image starts and the faults in the areas of the color separations. This can be carried out, for example, by means of a computer, which recognizes the characteristics on the basis of an algorithm. This separation is possible as a result of the different lengths of the picture page or picture pages relating to the prints to be set up, since as a result the calculation is possible and can be carried out more simply with fewer unknowns.

A further problem is that, on the one hand, the shape of the curve must be capable of being reconstructed on the basis of point-by-point measurements in such a way that the above-described analysis of the curve is possible, but, on the other hand, no drift must distort the analysis of the curve. The printing of picture pages with register marks must, therefore, satisfy the condition that, by means of the register marks, sufficient measured points are available for the reconstruction of shape and position. In contrast, drift, for example, as a result of a change in the machine temperature, can be eliminated by computation. This is possible, or at least facilitated, as a result of the invention, since, because of the different lengths of the picture pages, the computation can be carried out with fewer unknowns. Once the data from the curve have been registered, an assignment of the image productions to positions on the image cylinders can be carried out in such a way that both the image starts and the areas of the color separations arrive in their desired position on the carrier or on a printing substrate located on the latter. At the same time, the assignment of the data from the register marks to positions of the elements that carry images and substrates can be carried out as a direct position assignment or as an indirect position assignment via recorded times.

A development of the method provides for the data from the register marks to be placed in a relationship with positions of the image cylinders and of the carrier, and for the image production equipment on the image cylinders, to be controlled in order to achieve the desired values on the carrier. With regard to the apparatus, it is proposed that the at least one setting device be designed such that it places the data from register marks in a relationship with positions of the image cylinders and of the carrier and uses these to control the image production equipment on the image cylinders in order to achieve the desired values on the carrier. This configuration is primarily for multicolor printing machines, in which the color separations are transferred directly from the image cylinders to printing substrates, which are located on a carrier.

If a printing machine is configured in such a way that image transfer cylinders are arranged between the image cylinders and the carrier for printing substrates, then, in addition to the measure just mentioned, it is proposed that the data from the register marks also be placed in a relationship with positions of the image transfer cylinders and included in the control of the image production equipment. With regard to the apparatus, it is proposed that the at least one setting device be designed such that it places the data from the register marks in a relationship with positions of the image transfer cylinders, as well, and includes it in the control of the image production equipment. This measure is particularly important, since, for the necessary contact between image cylinder and image transfer cylinder, at least one of the surfaces may have a certain elasticity. Provision is generally made for the image transfer cylinder to be equipped with an elastic cover. As a result of the deformation of an elastic surface of this case in the type of two cylinders at whose point of contact the transmission of force takes place, overdrive of one cylinder with respect to the other occurs, since the behavior of the elastic material influences the transmission ratio. In order to eliminate this fact, as well as any nonroundness or other irregularities of the image transfer cylinder, it is necessary for the data from the register marks also to be placed in a relationship with the image transfer cylinders and taken into account in the control of the image production equipment as correction values assigned to the positions of the image transfer cylinders.

The method is expediently configured in such a way that separate correction values are determined for the production of the image starts and the areas of the color separations, the production of the areas depending on the image starts. With regard to the apparatus, the at least one setting device is designed in a corresponding way. If, given a corresponding control system, an image start is positioned exactly, then the areas of the color separations can follow this, it being possible for each individual area to be positioned in accordance with the correction values for the areas of the color separations.

The at least one picture page with register marks can have an extra length, it then being possible under certain circumstances for a single picture page to suffice for determining the correction values. Another possibility is for a number of picture pages that are shorter than the prints whose register is to be set, be set up. In the first-mentioned case, it is expedient if the length of a picture page is selected such that a number of periods of faults of areas of color separations are detected. In the second case, it is expedient if the shorter picture pages are positioned such that they contain a number of periods of faults of image starts. Since the faults relating to the image starts and the faults relating to the areas of color separations generally exhibit a periodic variation, these periods can be measured, and, in this way, it is easily possible to classify the data from the register marks, that is to say, the measured actual values, in accordance with actual values relating to the image starts and in accordance with actual values relating to the areas of color separations, and to carry out the control in the above-mentioned way. With regard to the apparatus, provision is then made for the at least one setting device to be designed for the evaluation in the aforementioned way.

For the method, it is proposed that the register marks be designed in such a way that the actual positions of the image starts can be detected from them and that the correction values be determined from a comparison between the actual and the desired positions. In addition, it is proposed that the register marks be designed in such a way that the actual positions of the areas can be detected from them and that the correction values be determined from a comparison between the actual and the desired positions. With regard to the apparatus, it is proposed that it be designed such that it determines the correction values in the aforementioned way from the data from the detected register marks.

The areas of the color separations can be lines of image points or groups of lines of image points. The apparatus is then correspondingly designed for the calculation of areas, which can be lines of image points or groups of lines of image points.

In order to assign the areas to positions of elements that carry images and substrates, there are various possibilities. Firstly, the position assignment can be carried out indirectly via a time assignment, or it can be performed in a direct way as a position assignment. In the latter case, as a particularly expedient configuration, it is proposed that the position of the areas be assigned to defined angular positions of the image cylinders. With regard to the apparatus, it is proposed that it be equipped with at least one sensor for at least one position measurement and be designed such that it assigns the position of the areas to defined angular positions of the image cylinders. In this case, it is particularly expedient to define angular sequences of the image cylinders permanently and to assign the sizes of the areas to these defined angular sequences. The apparatus is also designed for a corresponding assignment. This assignment to defined angular sequences of the image cylinders is a simple method for eliminating different transfers of the areas in different positions of the elements transferring them during the production of the color separations in such a way that the accuracy of the register on the printing substrate is subsequently ensured. Simple correction of the size of the areas can then be made by changing the spacing of the lines of image points.

Further possibilities for determining the correction values for the image starts or for the areas of the color separations consist in the position of the image starts being assigned to the position of specific areas spaced apart in a defined way or, in the other case, in the correction values for the areas being determined by the actual values of the position of many image starts. The apparatus is then designed for an appropriate assignment or determination.

The method is preferably configured in such a way that, from the data from the register marks, the separate acquisition of the actual values of the image starts and of the actual values of the areas of the color separations is carried out by the data obtained by detecting the register marks being separated by means of appropriate algorithms on the basis of their different characteristics. For this purpose, it is proposed that the apparatus contain a computer which is loaded with algorithms, by means of which it separates the data (16) obtained by means of the detection of the register marks (9, 9', 9", 9'") on the basis of the different characteristics of the actual values of the image starts (10) and the actual values of the areas (10', 10'", . . . 10^n^). Precisely for this configuration, the measure according to the invention, with the picture pages with lengths differing from those of the prints, offers the advantage that the calculation can be carried out with a tolerable effort and quickly enough. Situations in which a separation of this type is not possible are ruled out by the measures according to the invention.

Provision may be made for the test print of the at least one picture page to be made before a printing substrate is printed, in order to preset the register, and the calculation is used to check that the first substrate printed is already completely inregister. In this case, the calculation of the correction values according to the invention offers the major advantage that machines can be designed in such a way that different individual pages can also be printed completely inregister. Here, it is expedient if the test print is printed onto the carrier for printing substrates and is removed again after the evaluation. For this purpose, the apparatus is equipped with a device for removing test prints of picture pages from the carrier.

Of course, however, for register control, a test print can also be made during the printing of the printing substrates, it being possible for the test prints to be applied for example to areas of the carrier that are not covered by printing substrate and to be removed again after the evaluation. This measure has, for example, the advantage that a drift correction can be recorded during the print and counteractive control by means of appropriate correction values can be performed immediately.

The invention will be explained below using the drawing, in which.

Figure 1:
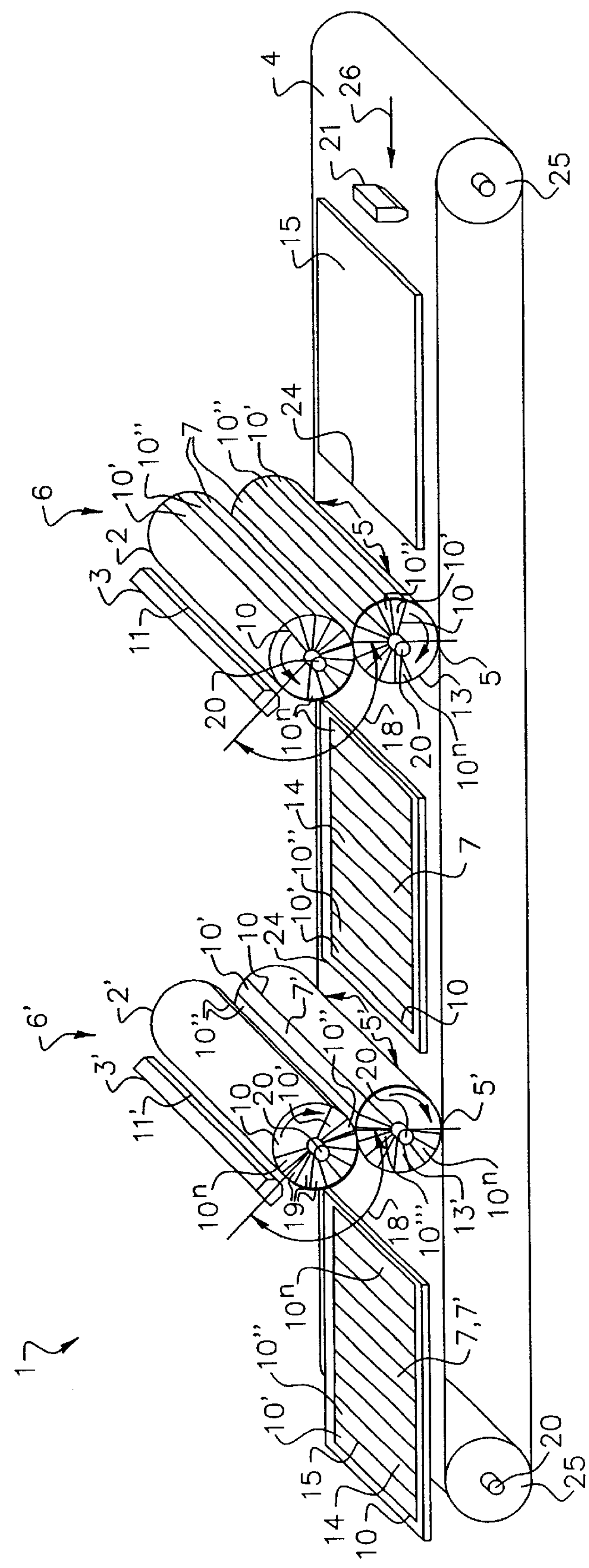
FIG. 1 shows the principle of a multicolor printing machine whose register can be set in accordance with the invention.

FIG. 1 shows the principle of a multicolor printing machine 1 whose register can be set in accordance with the invention. As a rule, such a multicolor printing machine 1 comprises four or more color printing units 6, 6', 6", 6'". For the purpose of simplification, only two color printing units 6 and 6' have been illustrated. These color printing units 6, 6' have image cylinders 2, 2', . . . and image production equipment 3, 3', . . . for producing color separations 7, 7', . . . , for example, electrostatic latent images. These color separations 7, 7', . . . are transferred from the image cylinder 2, 2', . . . to image transfer cylinders 13, 13', . . . , in order then to be applied to printing substrates 15 by these image transfer cylinders 13, 13' . . . . Here, each color printing unit 6, 6', . . . applies one color separation 7, 7', . . . , which together result in the color print.

The prints 14, whose register is to be set, have image starts 10 and are subdivided into areas 10', 10", . . . , 10^n^, this division being carried out for each color separation 7, 7' in order to control the production of the areas 10, 10', 10", . . . , 10^n^ in such a way that accurately registered overprinting, both of the image starts 10 and of the areas 10', 10", . . . , Ion can be achieved.

In order to achieve this register setting, the equipment 3, 3', . . . is controlled in such a way that the image production points 11, 11', . . . place the image starts 10 and the areas 10',

10", . . . , 10$^n$ in such positions on the image cylinders 2, 2', . . . that the color separations 7, 7', . . . are printed onto one another in relation to all the defined areas 10, 10', 10", . . . , 10$^n$. In order to achieve this, sensors 20 are provided for measuring the positions of all the elements 2, 2', . . . , 4, 13, 13', . . . that carry images and substrates. Also provided is a sensor 21 for detecting printing substrates 15, which gives an appropriate message to the setting devices 22, 22', 22", 22'".

The printing substrates 15 are transported in the direction of the arrow 26 by a carrier 4 for printing substrates 15, and are provided with a color separation 7, 7', . . . at an image transfer point 5' on each color printing unit 6, 6'. Opposite the image transfer points 5, 5', . . . , that is to say on the other side of the carrier 4, there are also impression cylinders, which assist the transfer of the color separations 7, 7', . . . to the printing substrates 15 mechanically and electrostatically. For simplicity, these impression cylinders are not illustrated here.

The configuration of the invention which is illustrated proposes to assign the defined areas 10, 10', 10", . . . , 10$^n$ of the color separations 7, 7', . . . to defined angular positions 18 of the image cylinders 2, 2', . . . in such a way that each area 10, 10', 10", 10$^n$ is assigned to a defined angular sequence 19 of the respective image cylinder 2, 2', . . . . In this case, however, the defined angular sequences 19 and the defined areas 10, 10', 10", . . . , 10$^n$ are shown as significantly larger than they are actually realized. The latter would be so small that they could not be represented in a drawing in this way; a subdivision with the maximum fineness is necessary to achieve quality prints.

Figure 2:
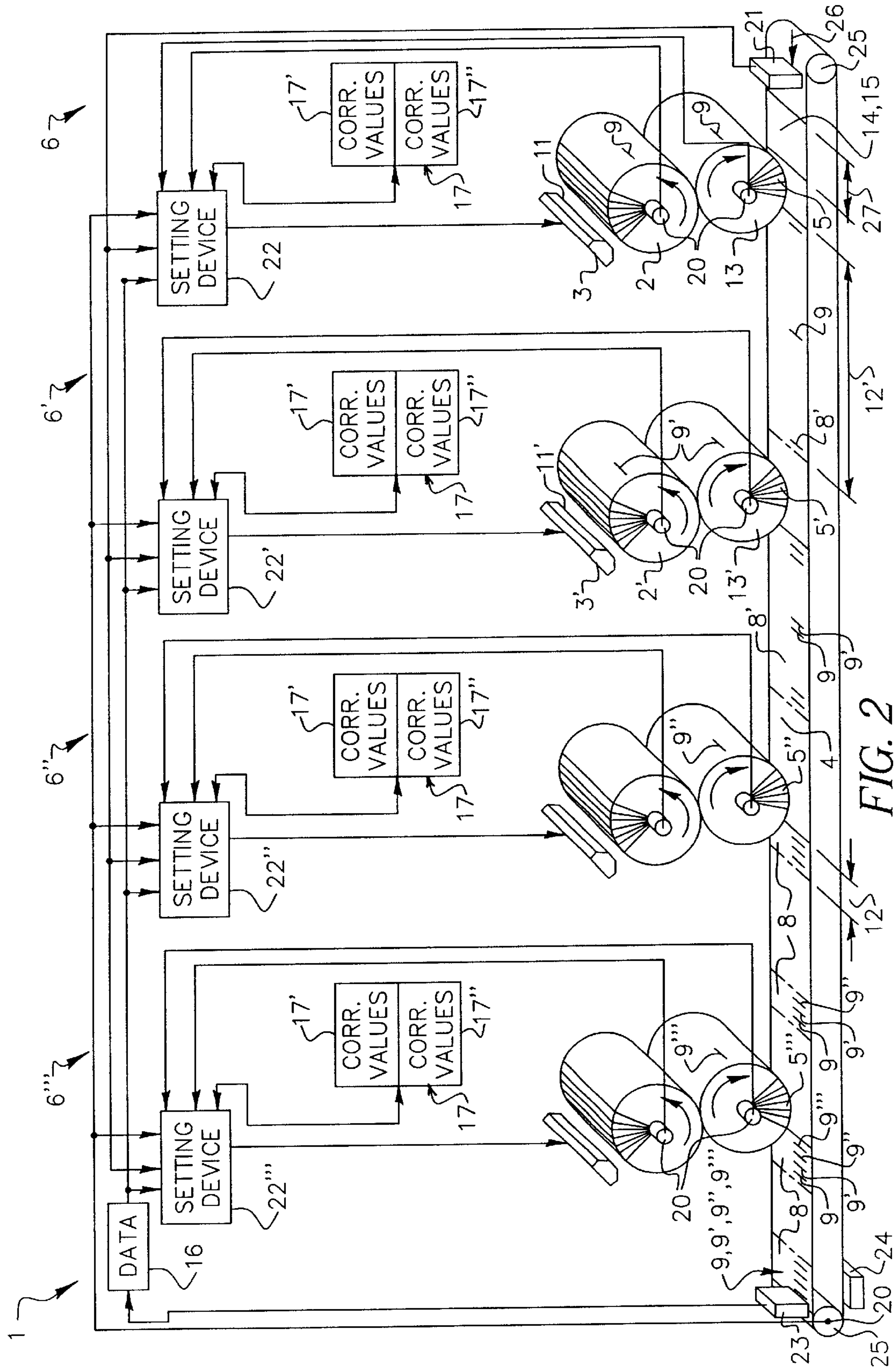
FIG. 2 shows an exemplary embodiment of the setting of register in accordance with the invention.

FIG. 2 shows an exemplary embodiment of a multicolor printing machine 1 with the implementation of a register setting in accordance with the invention. Here, the construction and functioning correspond to that described above. In this multicolor printing machine 1, each color printing unit 6, 6', 6", 6'" is assigned a setting device 22, 22', 22", 22'", which controls the equipment 3, 3', . . . for producing the color separations 7, 7', . . . in such a way that the image production points 11, 11', . . . are placed on the image cylinders 2, 2', . . . in such a way that the color separations 7, 7', . . . are printed over one another with accurate register as they are transferred to a printing substrate 15.

For this purpose, the invention provides that, before a print 14 is set up, its register is set, that is to say, before a printing substrate 15 runs through the machine as a test print, picture pages 8, 8', which contain register marks 9, 9', 9", 9'", are printed onto the carrier 4 for printing substrates 15. In this case, the picture pages 8, 8' are not material pages but imaginary pages, and their limits are, therefore, drawn dash-dotted. Each printing unit 6, 6', 6", 6'" prints at least one register mark 9, 9', 9", 9'" onto such a picture page 8, 8', but, preferably, a relatively large number of said marks. Thus, for example, one register mark 9 is produced by the item of equipment 3 for producing the color separation 7 on the image cylinder 2 and is then transferred to the carrier 4 by means of the image transfer cylinder 13. Register marks 9, 9", 9'" are set up in a corresponding way by the color printing units 6, 6", 6'". These register marks 9, 9', 9", 9'" are detected by means of a register sensor 23, and the data 16 from the register marks 9, 9', 9", 9'" is passed to the setting devices 22, 22', 22", 2'". For corresponding evaluation and control, sensors 20 for the position measurements are also provided. These are expediently angular position transmitters, which are assigned to all the elements 2, 2', . . . , 4, 13, 13' that carry images and substrates.

One problem when detecting the data 16 from the register marks 9, 9', 9", 9'", by means of the register sensor 23, is that two different faults enter the measured data 16 from the register marks 9, 9', 9", 9'", namely the faults relating to the image starts 10 and the faults relating to the defined areas 10', . . . , on of the color separations 7, 7', . . . . However, since faults relating to the image starts 10 are assignment faults of the image production points 11, 11', . . . of the individual color printing units 6, 6', 6", 6'", and the faults of the areas 10', 10", . . . , 10$^n$ of the color separations 7, 7', are transfer faults relating to the transfer of the color separations 7, 7', . . . from the image cylinders 2, 2', . . . as far as the image transfer points 5, 5', 5", 5'" to the printing substrates 15, the two faults require different corrections.

Although in each case the appropriate correction values 17, possibly combined as setting commands for the image production points 11, 11', . . . , are set up by the setting devices 22, 22', 22", 22'" on the basis of the data 16 from the register marks 9, 9', 9", 9'". These correction values 17 are also composed of correction values 17' for the image starts 10 and correction values 17" for the areas 10', 10", . . . , 10$^n$ of the color separations 7, 7', . . . . In each case, for each color separation 7, 7', . . . , the image start 10 is corrected first and the corrections for the areas 10', 10", . . . , 10$^n$ are made afterwards. For this reason, before determining the correction values 17, an evaluation of the data 16 from the register marks 9, 9', 9", 9'" must be carried out in such a way that, at least by computation, correction values 17' for the image starts 10 and correction values 17" for the areas 10', 10", . . . , 10$^n$ are available. Only then will the correction values 17' and 17" be combined again to form appropriate setting signals for the image production equipment 3, 3', . . . .

Figure 3:
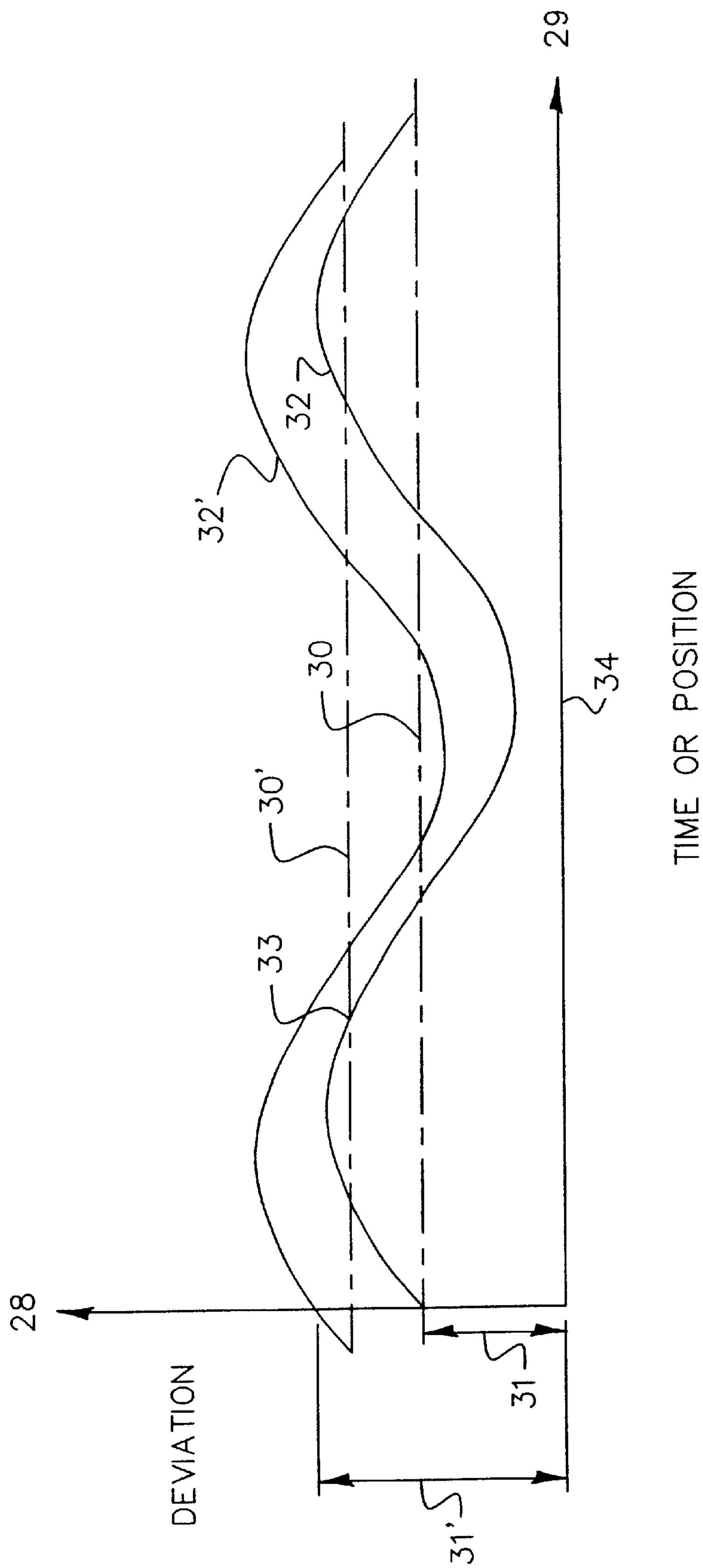
FIG. 3 shows an example of a curve of deviations resulting from measurements from the register sensor.

In order to explain the problem to be solved here, use is made of the illustration of FIG. 3, which illustrates an example of curves 32, 32' of deviations of measured points 33 from the desired position 34, which curves result from the measurements from the register sensor 23. In the graph illustrated, the deviations 28 from the desired position 34 are plotted against the time 29 or, preferably, the positions 29 of the carrier 4. The positions 29 can be measured by means of an angular position transmitter- 20, which is assigned to a roller 25, preferably, the drive roller of the carrier 4.

At their beginning, the curves 32, 32' that result from a large number of measured points 33 generally have an offset 31, 31', that is to say, an intercept not equal to zero. These are, in each case, the faults for the image starts 10 of color separations 7, 7', . . . . The curves 32, 32' then describe, in a periodic way, the deviations of the areas 10', 10", . . . , 10$^n$ of one of the color separations 7, 7' . . . . The average value 30, 30' of a curve 32, 32' can run as illustrated, but drift is also possible, which manifests itself by means of an increase or decrease in the average value 30, 30'. In addition, the offset 31, 31' relating to a number of image starts 10 generally results in a similar periodic curve, which is then measured in order to correct the image starts 10 as well.

In order to set the register, an analysis of such a curve 32, 32' is necessary, in order to correct the faults of the image starts 10, that is to say, the offset 31, 31' in order then to correct the faults of the areas 10', 10", . . . , 10$^n$ and, if necessary, any drift which occurs as well. The solution to this problem during the calculation starts from the fact that equations with a number of unknowns have to be solved. In order to process the data 16 with a tolerable effort, the number of unknowns has to be reduced, which is possible as a result of the fact that the register marks 9, 9', 9", 9'" are combined into picture pages 8, 8' which have a length 12, 12', differing from the length 27 of the prints 14 whose register is to be set. On the one hand, there is the possibility here of producing a long picture page 8' which contains a large number of register marks 9, 9', 9", 9'". However, many short picture pages 8 can also be produced, being positioned in a predefined way in relation to one another. In this way, the setting devices 22, 22', 22", 22'" calculate the correction values 17, 17', 17" for the respective image productions by the image production equipment 3, 3', . . . . The corresponding control commands are illustrated by the arrows on the setting devices 22, 22', 22", 22'" to the items of equipment 3, 3' . . . . In this case, the correction values 17, 17', 17" are expediently assigned to defined angular positions 18 of the image cylinders 2, 2', . . . . As already mentioned, the assignment can be made by the areas 10', 10", . . . , 10$^{n}$ being assigned to defined angular sequences 19 of the image cylinders 2, 2", . . . .

For the evaluation of the data 16 and the corresponding control of the image production equipment 3, 3', . . . , the setting devices 22, 22', 22", 22'" are connected to sensors 20 for measuring the positions of the image cylinders 2, 2', . . . of the image transfer cylinders 13, 13', and of the carrier 4. Furthermore, they receive a signal from a sensor 21 when a printing substrate 15 passes this sensor 21. In a corresponding way, the starting signal for the production of the respective color separations 7, 7', . . . is then given.

The exemplary embodiment illustrated is, of course, only an example. It is also possible, in this way, for printing machines to be controlled in which the color separations 7, 7', . . . are transferred directly from the image cylinders 2, 2', . . . to the printing substrates 15. The control can also be configured somewhat differently; for example, instead of the setting devices 22, 22', 22", 22'", which are each assigned to a printing unit 6, 6', 6", 6'", a common control system for all the printing units can be provided. Further different configurations of the method and of the construction of the machine are also conceivable.

| Parts List | |
|---|---|
| 1 | Multicolor printing machine |
| 2, 2', . . . | Image cylinders |
| 3, 3', . . . | Image production equipment for producing color separations, for example, electrostatic latent images |
| 4 | Carrier for printing substrates |
| 5, 5', 5", 5'" | Image transfer points |
| 6, 6', 6", 6'" | Color printing units |
| 7, 7' | Color separations |
| 8, 8' | Picture pages |
| 8 | Short picture pages |
| 8' | Long picture pages |
| 9, 9', 9", 9'" | Register marks (from various color printing units) |
| 10, 10', 10", . . . , 10$^{n}$ | Defined areas of the color separations |
| 10 | Image starts/start of image setting |
| 10', 10", . . . , 10$^{n}$ | Areas of the color separations into which the image area is subdivided |
| 11, 11', . . . | Image production points |
| 12, 12' | Length of a picture page |
| 12 | Shorter length |
| 12' | Extra length |
| 13, 13' | Image transfer cylinders |
| 14 | Prints whose register is to be set |
| 15 | Printing substrates |
| 16 | Data from the register marks |
| 17, 17', 17" | Correction value |
| 17' | Correction values for the image starts |
| 17" | Correction values for the areas of the color separations |
| 18 | Defined angular positions of the image cylinders |

-continued

| Parts List | |
|---|---|
| 19 | Defined angular sequences |
| 20 | Sensors for position measurements (angular position transmitters) |
| 21 | Sensor for detecting printing substrates |
| 22, 22', 22", 22'" | Setting devices |
| 23 | Register sensor |
| 24 | Device for removing test prints from the carrier |
| 25 | Rollers for driving and guiding the carrier |
| 26 | Arrow: transport direction of the printing substrates |
| 27 | Length of a print |
| 28 | Deviation from the desired position |
| 29 | Time or position of the carrier |
| 30, 30' | Average value |
| 31, 31' | Offset |
| 32, 32' | Curve which indicates the deviations of the measured points from the desired position |
| 33 | Measured point |
| 34 | Desired position |

What is claimed is:

1. A method for setting register on a multicolor printing machine (1) having color printing units (6, 6', 6", 6'") assigned to various printing inks, at least one image cylinder (2, 2', . . . ), image production equipment (3, 3', . . . ) for producing color separations (7, 7', . . . ), in particular electrostatic latent color separations (7, 7', . . . ), on the at least one image cylinder (2, 2', . . . ), a carrier (4) for printing substrates (15) and at least one image transfer point (5, 5', 5", 5'") for the transfer of the color separations (7, 7', . . . ) to the printing substrates (15), an assignment of the image production points (11, 11', . . . ) on the at least one image cylinder (2, 2', . . . ) being carried out in order to achieve coincidence of register between the color separations (7, 7', . . . ) in the print, by both the production of the image starts (10) and the production of areas (10', 10", . . . , 10$^{n}$) of the color separations (7, 7', . . . ) being set on the basis of the print and the evaluation of register marks (9, 9', 9", 9'"), wherein at least one picture page (8, 8') is printed which has register marks (9, 9', 9", 9'") and has a length (12, 12') differing from that of the prints (14) whose register is to be set, and wherein, in order to determine the correction values (17, 17', 17", 17'"), the data (16) from the register marks (9, 9', 9", 9'") of the at least one picture page (8, 8', . . . ) are measured and placed in a relationship with positions of elements (2, 2', . . . , 4, 13, 13', . . . ) that carry images and substrates, and the image production equipment (3, 3', . . . ) is controlled in accordance with the correction values (17, 17', 17").

2. The method as claimed in claim 1, wherein the data (16) from the register marks (9, 9', 9", 9'") is placed in a relationship with positions of the image cylinders (2, 2', . . . ) of the carrier (4), and the image production equipment (3, 3', . . . ) on the image cylinders (2, 2', . . . ) is controlled in order to achieve the desired values on the carrier (4).

3. The method as claimed in claim 2, wherein the data (16) from the register marks (9, 9', 9", 9'") is also placed in a relationship with positions of the image transfer cylinders (13, 13', . . . ) and included in the control of the image production equipment (3, 3', . . . ).

4. The method as claimed in claim 3, wherein separate correction values (17', 17") are determined for the production of the image starts (10) and the areas (10', 10", . . . , 10$^{n}$) of the color separations (7,7', . . . ), the production of the areas (10', 10", . . . , 10$^{n}$) depending on the image starts (10).

5. The method as claimed in claim 4, wherein the at least one picture page (8') has an extra length (12') with respect to the prints (14).

6. The method as claimed in claim 5, wherein a number of picture pages (8) that are shorter (12') than the prints (14) are set up.

7. The method as claimed in claim 5, wherein the length (12') of a picture page (8') is selected such that a number of periods of faults of areas (10', 10', . . . , $10^n$) of color separations (7, 7', . . . ) can be detected.

8. The method as claimed in claim 6, wherein the shorter (12) picture pages (8) are positioned such that they contain a number of periods of faults of image starts (10).

9. The method as claimed in claim 8, wherein the register marks (9, 9', 9", 9''') are designed in such a way that the actual positions of the image starts (10) can be detected from them, and wherein the correction values (17, 17', 17") are determined from a comparison between the actual and the desired positions.

10. The method as claimed in claim 8, wherein the register marks (9, 9', 9", 9''') are designed in such a way that the actual positions of the areas (10', 10", . . . , $10^n$) can be detected from them, and wherein the correction values (17, 17', 17") are determined from a comparison between the actual and the desired positions.

11. The method as claimed in claim 10, wherein the areas (10', 10", . . . , $10^n$) are lines of image points.

12. The method as claimed in claim 10, wherein the areas (10', 10", . . . , $10^n$) are groups of lines of image points.

13. The method as claimed in claim 10, wherein the position of the areas (10, 10", . . . , $10^n$) is assigned to defined angular positions (18) of the image cylinders (2, 2', . . . ).

14. The method as claimed in claim 13, wherein the size of the areas (10', 10", . . . , $10^n$) are assigned to defined angular sequences (19) of the image cylinders (2, 2', . . . ).

15. The method as claimed in claim 14, wherein, when correcting the size of the areas (10', 10", . . . , $10^n$), a change is made to the spacing of the lines of image points.

16. The method as claimed in claim 15, wherein the correction values for the image starts (10) are determined by means of the actual values for the areas (10', 10", . . . , $10^n$).

17. The method as claimed in claim 16, wherein the position of the image starts (10) is assigned to the position of specific areas (e.g. 10' and $10^{n+1}$) spaced apart in a defined way.

18. The method as claimed in claim 15, wherein the correction values (17, 17', 17") for the areas (10', 10", . . . , $10^n$) are determined by means of the actual values of the position of many image starts (10).

19. The method as claimed in claim 18, wherein, from the data (16) from the register marks (9, 9',9", 9'''), the separate acquisition of the actual values of the image starts (10) and of the actual values of the areas (10', 10", . . . , $10^n$) is carried out by the data (16) obtained by detecting the register marks (9, 9', 9", 9''') being separated by means of appropriate algorithms and on the basis of their different characteristics.

20. The method as claimed in claim 19, wherein the test print of the at least one picture page (8, 8') is made before a printing substrate (15) is printed preset, in order to the register.

21. The method as claimed in claim 20, wherein the test print is printed onto the carrier (4) for printing substrates (15) and is removed again after the evaluation.

22. The method as claimed in claim 21, wherein, for register control, test prints are made during the printing of the printing substrates (15).

23. The method as claimed in claim 22, wherein the test prints are applied to areas of the carrier (4) for printing substrates (15) that are not covered by printing substrates (15) and are removed again after the evaluation.

24. Apparatus for setting register in accordance with a method as claimed in claim 23 on a multicolor printing machine (1) having color printing units (6, 6', 6", 6''') assigned to various printing inks, at least one image cylinder (2, 2', . . . ), image production equipment (3, 3', . . . ) for producing color separations (7, 7', . . . ), in particular electrostatic latent color separations (7, 7', . . . ), on the at least one image cylinder (2, 2', . . . ), a carrier (4) for printing substrates (15) and at least one image transfer point (5, 5', 5", 5''') for the transfer of the color separations (7, 7', . . . ) to printing substrates (15), sensors (20, 21) for measuring positions and at least one setting device (22, 22', 22", 22''') for assigning the positions of the image production points (11, 11', . . . ) on the at least one image cylinder (2, 2', . . . ) in order to achieve coincidence of register between the color separations (7, 7', . . . ) in the print, at least one register sensor (23) being arranged to detect register marks (9, 9', 9", 9'''), and the at least one setting device (22, 22', 22", 22''') being designed such that it initiates the test printing of register marks (9, 9', 9", 9''') and evaluates them in such a way that it sets the production of the image starts (10) and the production of areas (10', 10", . . . , $10^n$) of the color separations (7, 7', . . . ) on this basis, wherein it has at least one setting device (22, 22', 22", 22''') which is designed such that it initiates the printing of at least one picture page (8, 8') which has register marks (9, 9', 9", 9''') and has a length (12, 12') differing from that of the prints (14) whose register is to be set, and wherein the at least one setting device (22, 22', 22", 22''', 22'''') is designed such that, in order to determine the correction values (17, 17', 17"), it places the data (16) from the detected register marks (9, 9', 9", 9''') in a relationship with positions of elements (2, 2', . . . , 4, 13, 13', . . . ) that carry images and substrates, and controls the image production equipment (3, 3', . . . ) in accordance with these correction values (17, 17', 17").

25. The apparatus as claimed in claim 24, wherein the at least one setting device (22, 22', 22", 22''') is designed such that it places the data (16) from the register marks (9, 9', 9", 9''') in a relationship with positions of the image cylinders (2, 2', . . . ) and of the carrier (4) and uses these to control the image production equipment (3, 3', . . . ) on the image cylinders (2, 2', . . . ) in order to achieve the desired values on the carrier (4).

26. The apparatus as claimed in claim 25, wherein the at least one setting device (22, 22', 22", 22''') is designed such that it also places the data (16) from the register marks (9, 9', 9", 9''') in a relationship with positions of the image transfer cylinders (13, 13', . . . ) and includes said data in the control of the image production equipment (3, 3', . . . ).

27. The apparatus as claimed in claim 26, wherein the at least one setting device (22, 22', 22", 22''') determines separate correction values (17', 17") for the production of the image starts (10) and the areas (10', 10", . . . , $10^n$) of the color separations (7, 7', . . . ), and the production of the areas (10', 10", . . . , $10^n$) depends on the image starts (10).

28. The apparatus as claimed in claim 27, wherein the at least one setting device (22, 22', 22", 22''') is designed to evaluate at least one picture page (8') which has an extra length (12') with respect to the prints (14).

29. The apparatus as claimed in claim 28, wherein the at least one setting device (22, 22', 22", 22''') is designed to evaluate a number of picture pages (8) that are shorter (12) than the prints (14).

30. The apparatus as claimed in claim 29, wherein it is designed to evaluate a picture page (8') which comprises a number of periods of faults of areas (10, 10', . . . , $10^n$) of color separations (7, 7', . . . ).

31. The apparatus as claimed in claim 30, wherein it is designed to evaluate a number of shorter (12) picture pages (8), which are positioned such that they contain a number of periods of faults of image starts (10).

32. The apparatus as claimed in claim 31, wherein it is designed such that it determines the actual positions of the image starts (10) from the data (16) from the detected register marks (9, 9', 9", 9'"), and determines the correction values (17') from a comparison between the actual and the desired positions.

33. The apparatus as claimed in claim 32, wherein it is designed such that it determines the actual positions of the areas (10', 10", . . . , 10^n) from the data (16) from the detected register marks (9, 9', 9", 9'"), and determines the correction values (17") from a comparison between the actual and the desired positions.

34. The apparatus as claimed in claim 33, wherein it is designed to calculate areas (10', 10", . . . , 10^n), which are lines of image points.

35. The apparatus as claimed in claim 34, wherein it is designed to calculate areas (10', 10", . . . , 10^n), which are groups of lines of image points.

36. The apparatus as claimed in claim 35, wherein it is equipped with at least one sensor (20) for at least one position measurement, and is designed such that it assigns the position of the areas (10', 10", . . . , 10^n) to defined angular, positions (18) of the image cylinders (2, 2', . . . ).

37. The apparatus as claimed in claim 36, wherein it is designed such that it assigns the size of the areas (10', 10", . . . , 10^n) to defined angular sequences (19) of the image cylinders (2, 2', . . . ).

38. The apparatus as claimed in claim 37, wherein it is designed such that it makes a correction to the size of the areas (10', 10", . . . , 10^n) by means of a change to the spacing of the lines of image points.

39. The apparatus as claimed in claim 38, wherein it is designed such that it determines the correction values for the image starts (10) by means of the actual values for the areas (10', 10", . . . , 10^n).

40. The apparatus as claimed in claim 39, wherein it is designed such that it assigns the position of the image starts (10) to the position of specific areas (e.g. 10' and 10~1) spaced apart in a defined way.

41. The apparatus as claimed in claim 40, wherein it is designed such that it determines the correction values for the areas (10', 10", . . . , 10^n), by means of the actual values of the position of many image starts (10).

42. The apparatus as claimed in claim 41, wherein it contains a computer which is loaded with algorithms by means of which it separates the data (16) obtained by means of the detection of the register marks (9, 9', 9", 9'") on the basis of the different characteristics of the actual values of the image starts (10) and the actual values of the areas (10', 10", . . . , 10^n).

43. The apparatus as claimed in claim 42, wherein it is equipped with a device (24) for removing test prints of picture pages (8, 8') from the carrier (4).

44. A multicolor printing machine (1) having color printing units (6, 6', 6", 6'") assigned to various printing inks, at least one image cylinder (2, 2', . . . ), image production equipment (3, 3', . . . ) for producing color separations (7, 7', . . . ), in particular electrostatic latent color separations (7, 7', . . . ), on the at least one image cylinder (2, 2', . . . ), a carrier (4) for printing substrates (15) and at least one image transfer point (5, 5', 5", 5'") for the transfer of the color separations (7, 7', . . . ) to the printing substrates (15), sensors (20, 21) for measuring positions' and at least one setting device (22, 22', 22", 22'") for assigning the positions of the image production points (11, 11', . . . ) on the at least one image cylinder (2, 2', . . . ) in order to achieve coincidence of register between the color separations (7, 7', . . . ) in the print, at least one register sensor (23) being arranged to detect register marks (9, 9', 9", 9'"), and the at least one setting device (22, 22', 22", 22'") being designed such that it initiates the test printing of register marks (9, 9', 9", 9'") and evaluates them in such a way that it sets the production of the image starts (10) and the production of areas (10', . . . , 10^n) of the color separations (7, 7', . . . ) on this basis, wherein it has at least one setting device (22, 22', 22", 22'") which is designed such that it initiates the printing of at least one picture page (8, 8') which has register marks (9, 9', 9", 9'") and has a length (12, 12') differing from that of the prints (14) whose register is to be set, and wherein the at least one setting device (22, 22', 22", 22") is designed such that, in order to determine the correction values (17, 17', 17"), it places the data (16) from the detected register marks (9, 9', 9", 9'" in a relationship with positions of elements (2, 2', . . . , 4, 13, 13', . . . ) that carry images and substrates, and controls the image production equipment (3, 3', . . . ) in accordance with these correction values (17, 17', 17").

* * * * *